US008220323B2

(12) United States Patent
Paul et al.

(10) Patent No.: US 8,220,323 B2

(45) Date of Patent: Jul. 17, 2012

(54) FREEFALL ARRESTOR

(75) Inventors: Wolfgang Paul, Bad Schwartau (DE); Dirk Heidemann, Schwerte (DE)

(73) Assignee: Ruhrpumpen GmbH, Witten (DE)

( * ) Notice: Subject to any disclaimer, the term of this patent is extended or adjusted under 35 U.S.C. 154(b) by 299 days.

(21) Appl. No.: 12/799,685

(22) Filed: Apr. 29, 2010

(65) Prior Publication Data

US 2010/0275682 A1 Nov. 4, 2010

(30) Foreign Application Priority Data

Apr. 30, 2009 (DE) ......................... 10 2009 019 328

(51) Int. Cl.
*G01L 5/28* (2006.01)

(52) U.S. Cl. ......................................................... 73/121

(58) Field of Classification Search .................... 73/121, 73/865.9

See application file for complete search history.

(56) References Cited

U.S. PATENT DOCUMENTS 4,611,613 A * 9/1986 Kaplan ........................ 134/95.3
4,673,442 A * 6/1987 Kaplan ........................... 134/24
5,076,893 A * 12/1991 Tong et al. .................... 202/241
6,050,277 A * 4/2000 Purton et al. .............. 134/167 R
7,112,261 B1 * 9/2006 TerWisscha et al. .............. 201/2
8,024,984 B2 * 9/2011 Paul et al. .................... 73/865.9
2006/0254902 A1 * 11/2006 TerWisscha et al. .......... 202/242
2010/0111625 A1 * 5/2010 Paul et al. ................. 408/115 R

* cited by examiner

*Primary Examiner* — Freddie Kirkland, III

(74) *Attorney, Agent, or Firm* — Luedeka Neely Group, P.C.

(57) ABSTRACT

The invention relates to a safety device for a crosshead of a decoking plant arranged by means of a carrying device to be liftable and lowerable on profiles of a frame above a drum adapted to receive material, such as coke, and guided on guide rails of the profiles by means of rolls, and carried by a cable of a winch slung around return pulleys at the top of the frame and around a carrying pulley rotatably supported at the top end of the crosshead; and equipped with brakes for stopping the crosshead in an emergency, when the carrying device fails, and for intercepting the crosshead and fixing it on the guide rails or on the profiles. For a safety device, a test apparatus is provided for testing the brakes on site, comprising a carrying device, such as a brace, attachable on the frame, on which the crosshead is mountable for simulating a free fall of the same by means of a release device, and an arrestor device for the crosshead releasably attachable on the frame at a distance below the brace.

7 Claims, 5 Drawing Sheets

FREEFALL ARRESTOR

CROSS-REFERENCE TO RELATED APPLICATIONS

This application claims priority to German Patent Application No. 10 2009 019 328.6 filed Apr. 30, 2009.

FIELD OF THE INVENTION

The present invention relates to a safety device for a crosshead of a decoking plant,

- arranged to be liftable and lowerable by means of a carrying device on profiles of a frame above a drum adapted to receive material, such as coke, and
- guided on guide rails of the profiles by means of rolls, and
- carried by a cable of a winch slung around return pulleys at the top of the frame and around a carrying pulley rotatably supported at the top end of the crosshead, and
- equipped with brakes for stopping the crosshead in an emergency when the carrying device fails and for intercepting the crosshead and fixing it on the guide rails or on the profiles.

BACKGROUND OF THE INVENTION

Decoking plants have a drum which gradually fills with coke during the operation of a refinery. This coke must be removed when the drum is full. For this purpose a decoking tool is introduced into the drum from the top end of the drum. The decoking tool is suspended from a hollow drill stem that is coupled to a drive for causing the drill stem to rotate with the tool in the operating state. The drill stem is arranged on the above-mentioned crosshead and has a pressurized-water connection coupled to a pressure hose liftable and lowerable together with the crosshead for supplying the pressurized water to the drill stem. The length of the drill stem corresponds at least to the height of the drum to be emptied. The decoking tool can be traversed to the drum bottom by means of the drill stem.

The drum is emptied in such a manner that water exiting through nozzles arranged on the tool at high pressure of more than 100 bars supplied via the drill stem will selectively remove the coke which has been deposited in the drum.

During this emptying process the tool traverses the entire height of the interior of the drum along its longitudinal axis. To do this, the crosshead is lowered in a corresponding fashion by means of the cable of the winch and pulled upwards in the frame after emptying the drum until the decoking tool has been lifted out of the drum and is accessible on a work platform above the drum.

This emptying of the drum by means of high-pressure water jets from the decoking tool guided downwards on the drill stem in a rotary manner causes the crosshead to carry a heavy load due to the pressurized-water hose filled with pressurized water, the pressurized-water connection, the drill stem and its drive and the tool, in the order of approx. 3 to 5 tons depending on the size of the decoking plant. Moreover, the crosshead guided on guide rails of the profiles of the frame above the drum is exposed to knocks and vibrations while the drum is emptied. This is why the maintenance of the operability of the guiding components, which hold the crosshead mainly during lifting and lowering on the guide rails of the profiles of the frame, and in particular the brakes, is of particular importance. While regular checking and maintenance of the carrying and guiding components of the crosshead on site is possible to a certain extent, testing the continuing operability of the brakes has hitherto only been possible by removing them and testing and maintaining them in the workshop. It is difficult, however, to recognize when checking and maintaining needs to be carried out on the brakes of the crosshead. That is why this point in time is deferred for as long as possible as long as the brake components seem impeccable from the outside, without the certain knowledge whether the brakes will be able to intercept the crosshead according to their predetermined function and to fix it on the guide rails or, depending on the construction, on the profiles, and to thus prevent a complete fall of the crosshead in an emergency, namely if the carrying device of the crosshead fails and the crosshead falls, for example, due to a cable breaking.

If the crosshead should indeed fall, considerable damage arises due to the impact of the crosshead with all the attached components, such as the crosshead-side parts of the cable lifting device, the pressure hose mostly filled with pressurized water, and the drill stem together with the tool, the drive and the pressurized-water connection, which also damages the working platform and the top area of the drum itself, and moreover the life and health of the personnel working on the working platform are at considerable risk.

This lack of safety has been deemed acceptable. The accidents which have happened mostly due to the cables of the cable lifting device breaking and have led to the corresponding crosshead falling within the frame above the drum without the crosshead being intercepted by the brakes and fixed on the guide rails or on the profiles have not led to the brakes of the crosshead being removed and checked at regular intervals, mainly to avoid having to interrupt the operation which can lead to considerable disruptions in the operation of the refinery.

SUMMARY OF THE INVENTION

It is therefore the object of the present invention to remove the safety risk of the brakes of the crosshead, or at least to reduce it in a sustainable manner, so that the approach by which the object is achieved will be accepted and carried out by the operators of decoking plants as economically viable.

The approach according to the present invention provides that

- a testing apparatus is provided for testing the brakes on site, comprising a carrying device attachable to the frame, such as a brace, on which the crosshead is mountable for simulating a free fall of the same with a release device,
- and an arrestor device for the crosshead releasably attachable on the frame at a distance below the brace.

In this way, according to the present invention, it becomes possible for the first time to test the operability and safety of the brakes of the crosshead on site, that is without having to remove the crosshead and test the brakes at a great height on the work platform above the drum or in the workshop. Moreover, the testing device according to the present invention allows a simulation of an emergency, for example, in such a manner that the crosshead falls uncontrollably due to a cable breaking or the like. Comparable test results can otherwise only be obtained in the workshop by acquiring and using a comparable frame and mounting the components of the test device, i.e. with a considerable amount of additional time, work and machine overhead. The execution of a brake test by means of the test device according to the present invention takes less than a working day if the test is competently prepared and carried out. In view of this relatively low overhead with regard to time and parts of the test device, the operator of a refinery will have the brakes of the crosshead tested on a regular basis—in view of the high risk of damage should a crosshead fall.

The test device according to the present invention comprises a brace mountable on the frame in the space between the guide rails of the crosshead, or another corresponding carrying device, on which the crosshead can be intentionally releasably mounted for brake testing purposes, namely with a release apparatus or a separating apparatus comparable in function, allowing the crosshead to be released from the brace or the other carrying device attached to the frame to simulate a free fall of the same. To do this, the carrying pulley of the crosshead is released from the cable of the winch and connected to the brace or the other carrying device by means of an attachment element instead.

An arrestor device for brake testing is fixedly mounted at a distance below the brace. Herein, the distance from the brace to the arrestor device is chosen such that the crosshead can traverse a distance after release from the brace in a free fall, so that the crosshead reaches a velocity sufficient for the emergency sensors to trigger the brakes, if possible without impacting on the arrestor device. Herein, the arrestor device should only intercept the crosshead if the effect of the brakes is found to be insufficient and thus the braking distance is too great. If the crosshead activates the brakes after release from the brace and after covering a sufficient distance in a free fall, the crosshead must be fixed on the guide rails after a predetermined braking distance at a suitable distance from the arrestor device if the brakes are to be deemed good or fulfilling the requirements. A relatively long braking distance or even contact between the crosshead and the arrestor device indicates that the brakes need servicing and their components and operating parameters, such as brake pressure and the like, must be checked and serviced, or replaced.

Preferably, the brace is releasably attached on the guide rails or on the profiles of the frame. For this purpose, a releasable screw connection is suitably selected along a sufficient section of the guide rails or the profiles in order to achieve secure frictional clamping engagement. To achieve this, the brace should have a double-wall configuration.

Preferably, an arm, pointing downward in operation, is fixed on the brace, on which the release device is provided, which carries the crosshead at the beginning of the brake testing.

For releasing or triggering the connection between the brace and the crosshead to initiate the free fall, various embodiments are conceivable. Preferably a release lever is pivotably supported on the above-mentioned arm, which is pivotable from a holding position, in which a suspension device of the crosshead is fixed on the arm, into a release position, in which the suspension device is released from the arm. The pivoting of the release lever to separate the connection between the crosshead and the arm is suitably effected from a safe distance by means of a cable or by means of an electric motor.

Preferably the crosshead is attachable to the brace by means of a suspension device, comprising a cable loop slung around the carrying pulley of the crosshead, and a shackle for engaging the release device on the arm of the brace. In this way a robust and reliable connection is established between the crosshead and the arm on the brace. Incidentally, even these components illustrate the small structural overhead required for the safety apparatus according to the present invention.

Furthermore, it is preferred if the arrestor device consists of a pair of spring brackets each releasably attachable on the profiles of the frame or on the guide rails on opposite sides. Furthermore, the spring brackets should each bear a vertically guided, sprung impact plunger, which can come into contact with an impacting surface on the underside of the crosshead in the freefall test. Again, the relatively small structural overhead of the safety apparatus according to the present invention is illustrated, as a pair of spring brackets of simple construction are sufficient as a safety apparatus in case the braking distance of the crosshead in the freefall test is too long, with the result that the crosshead is safely intercepted and fixed by the spring brackets acting as an arrestor device.

BRIEF DESCRIPTION OF THE DRAWINGS

The invention will be described hereinafter with reference to the accompanying drawings in more detail, in which.

DETAILED DESCRIPTION

Figure 1:
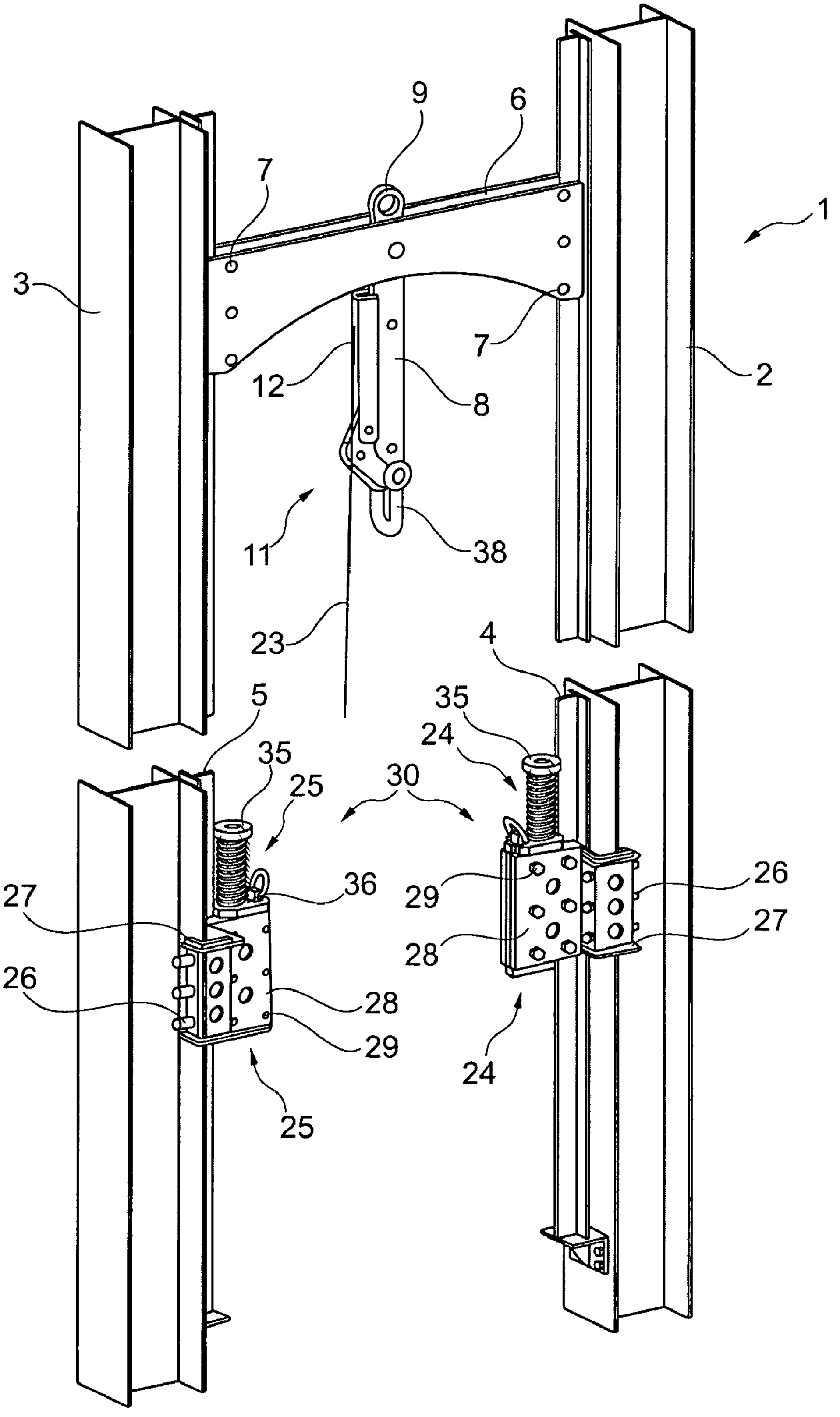
FIG. 1 is a perspective view of a portion of the frame formed of profiles and guide rails, with a brace and with a pair of spring brackets for a freefall test.
Figure 2:
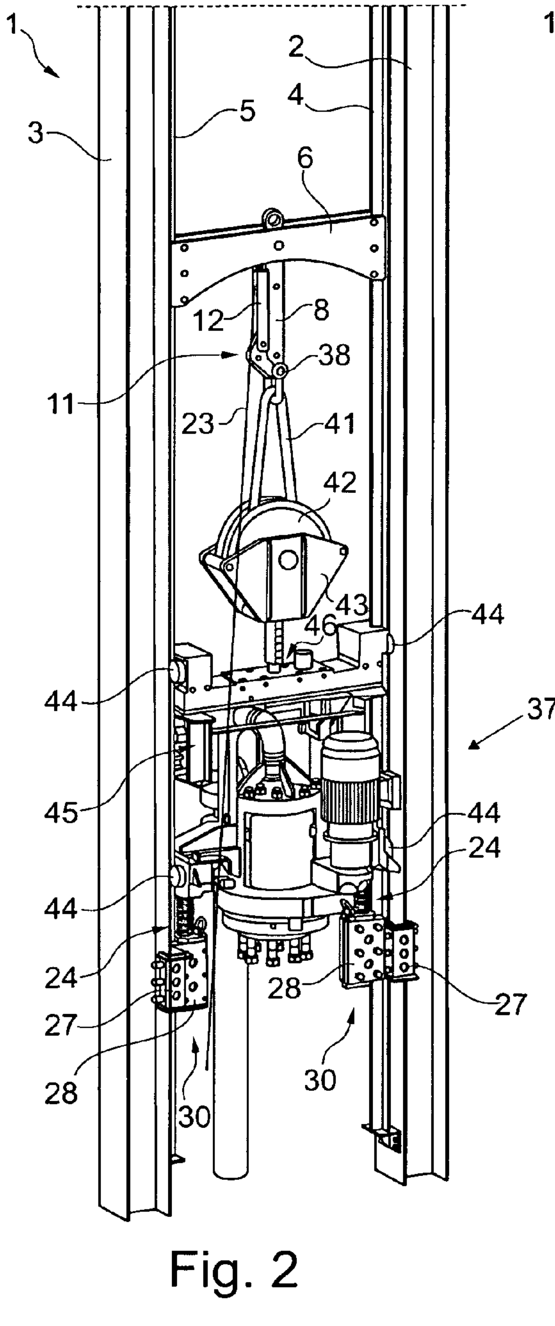
FIG. 2 is a perspective view similar to the one in FIG. 1, but with a crosshead inserted into the frame and suspended from the brace.
Figure 3:
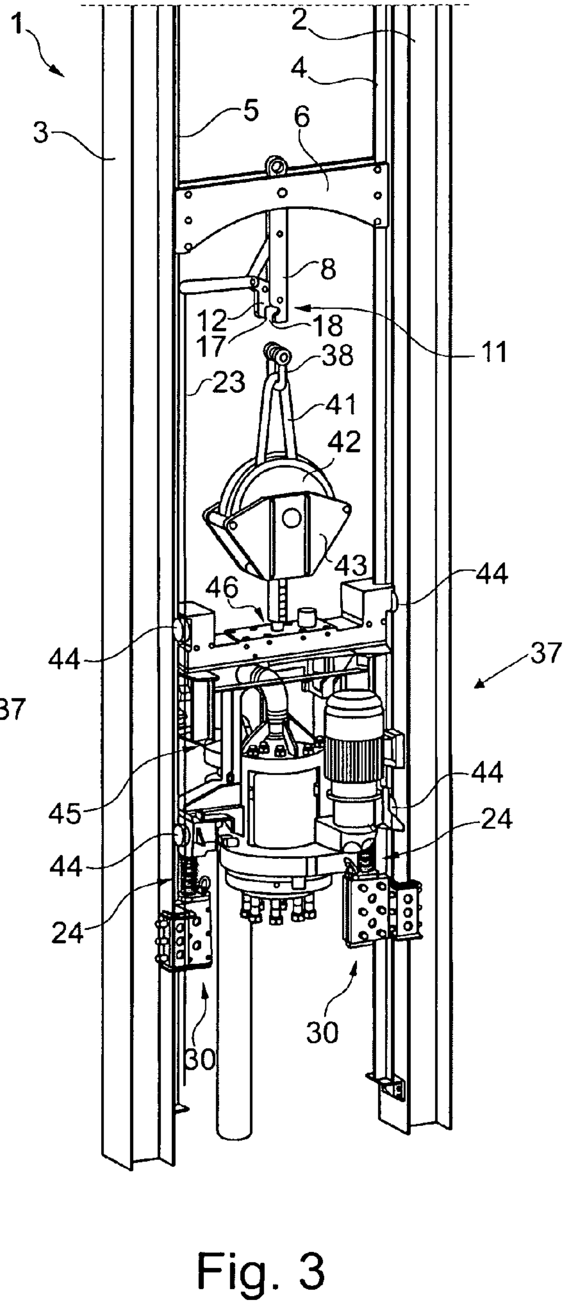
FIG. 3 is a perspective view as in FIG. 2, but after the connection between the crosshead and the brace has been released and after the crosshead has travelled a first freefall distance.

With reference to FIG. 1, it is illustrated how a frame 1 above a drum (not shown) for receiving and removing coke, in particular, of profiles 2, 3 and guide rails 4, 5 is prepared for carrying out a brake test of a crosshead 37 not shown in FIG. 1, but shown in FIGS. 2 and 3. At a distance below the top of frame 1, a brace 6 having double walls and an arcuate configuration at the bottom is fixed on guide rails 4, 5 attached on both sides by means of screws 7 in a non-displaceable manner. An eye 9 is centrally fixed on the brace for its handling, and an arm 8 is fixed centrally extending downwards from brace 6. Arm 8 is part of a release device 11, which includes a release lever 12 rotatably supported about a rotary axis 15 (FIGS. 4 and 5) on and adjacent to arm 8, and a shackle 38 for a releasable connection between crosshead 37 and arm 8 at its lower end. Release device 11 is operated from a safe distance by means of a cable 23 attached to the free end of release lever 12 in a cable eye 23*a*.

Figure 6:
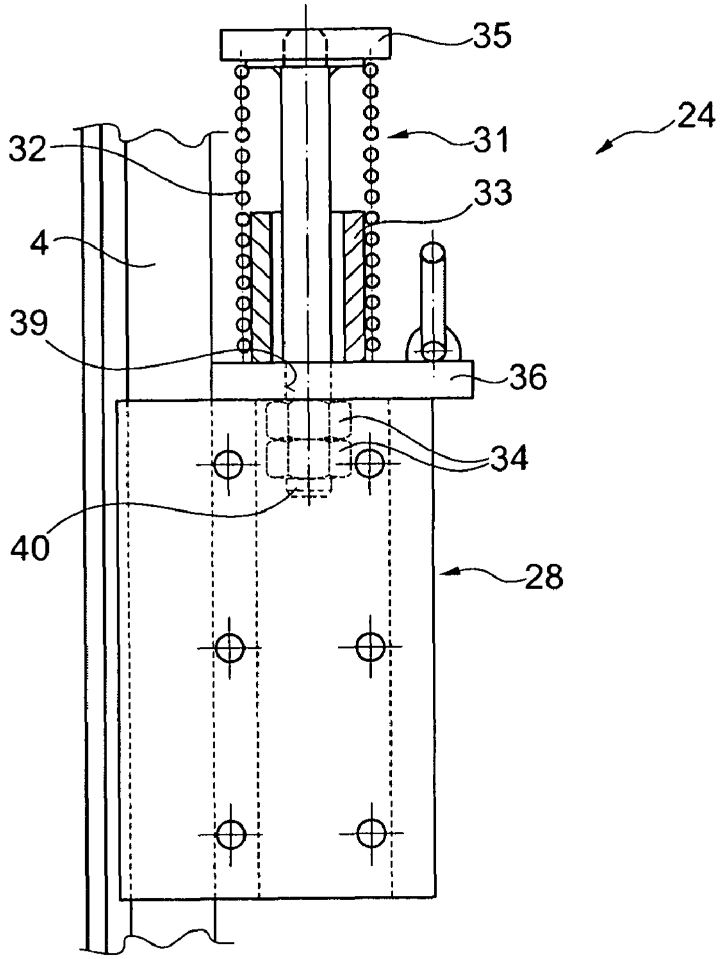
FIG. 6 is a side view of a spring bracket on a guide rail for the crosshead.
Figure 7:
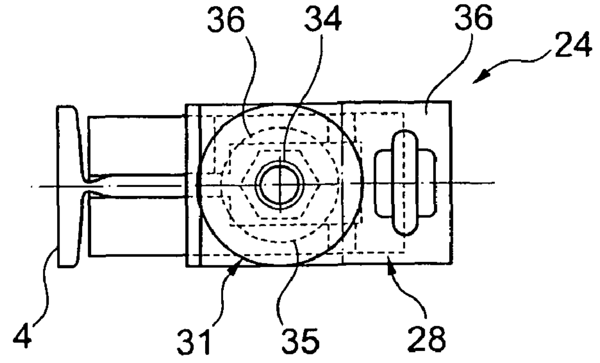
FIG. 7 is a plan view of the spring bracket of FIG. 6.

At a distance below brace 6, an arrestor device 30 is arranged comprising a pair of spring brackets 24, 25 oppositely mounted on frame 1. Each of spring brackets 24, 25 includes two clamps 27 fixed on profiles 2, 3 in an opposing position by means of screws 26, in a way illustrated in the drawing, wherein the clamp 27 at the back is hidden respectively in FIGS. 1 to 3. FIGS. 6 and 7 show details of the arrestor device 30 or the spring brackets 24 shown there, which is the mirror image of spring bracket 25. In FIGS. 6 and 7, spring bracket 24 is fixed to guide rail 4, while in FIGS. 1 to 3, it is shown embracing the corresponding profiles 2, 3. The basic structure of spring brackets 24, 25, however, is the same, and to be derived from FIGS. 1 to 3, if in doubt.

Incidentally, spring brackets 24, 25 each have an impact plunger 31, supported on an impact plate 25 in a sprung manner by a coil spring 33, which is guided in a guide sleeve 33, mounted on a plate 36 provided with a bore 39. Below plate 36, the threaded section 40 extending downwards through opening 39 of plate 36 is secured by means of counter nuts 34 forming an adjustable stop as the impact plunger 31 springs back. By means of the clamps 27 at both sides a bracket 28 is attached respectively, which extends towards the inside from each respective guide rail 4, 5 or the respective profile 2, 3 and consists of two halves connected by screws 29.

Figure 4:
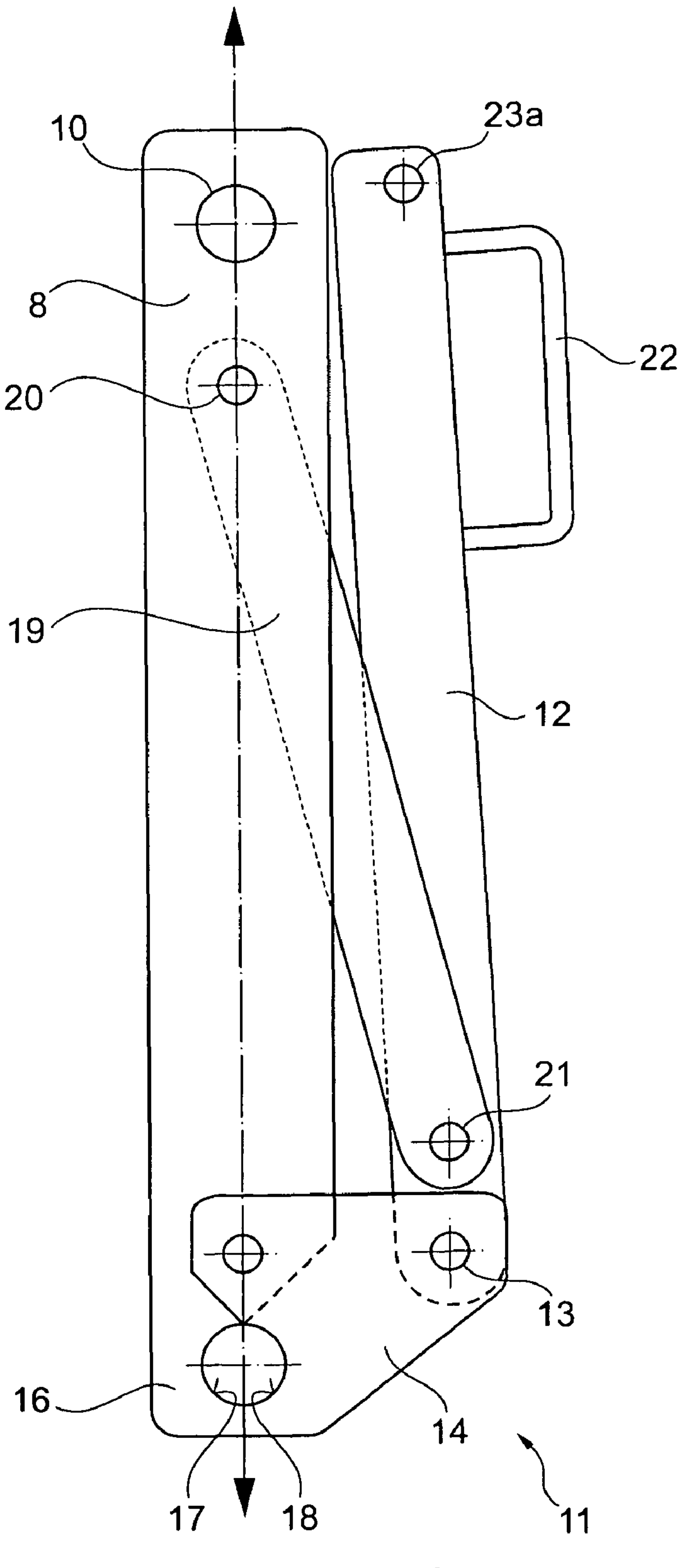
FIG. 4 is a side view of a release device in a holding position prior to a freefall test.
Figure 5:
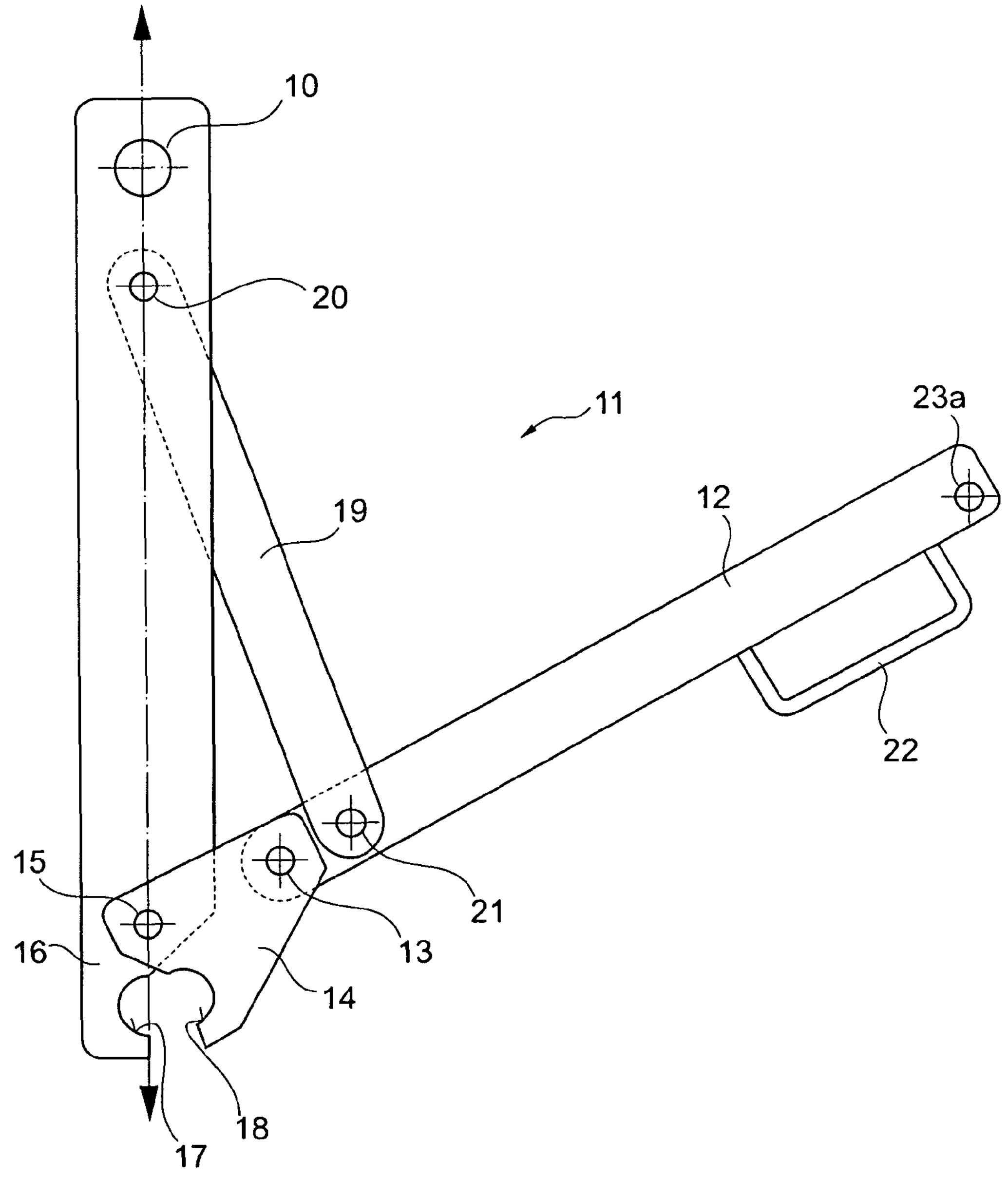
FIG. 5 is a side view of the release device of FIG. 4 in the state after release of a connection element (not shown) of the crosshead.

Release device 11 mainly shown in FIGS. 4 and 5 includes a plier plate 14 rotatable about a rotary axis 15 adjacent to the bottom end of release lever 12, forming a releasable retainer of release device 11 for the bolt (not shown) of shackle 38 to suspend crosshead 37 by means of a jaw 18 and a jaw 17 opposite the latter at the bottom end of arm 8. Release lever 12 is also connected to plier plate 14 by means of a rotary axis 13. A linkage lever 19, mounted to arm 8 by means of a rotary axis 20, the other end of which is mounted on release lever 12 by means of a rotary axis 21, completes the four-link transmission of release device 11 comprising four rotary axes 13, 15, 20 and 21. At the free end of release lever 12, there is a handle 22 for adjusting release device 11, while its release, as already mentioned, is effected by means of the cable 23 engaging cable eye 23*a* at the far end of release lever 12.

Release device 11 mainly shown in FIGS. 4 and 5 and described above assumes the holding position shown in FIG. 4 prior to a brake test, in which the bolt (not shown) of shackle 38 is held between jaws 17, 18 of arm 8 or plier plate 14, thus securely holding crosshead 37 overall. After the release of release device 11 by pivoting release lever 12 by means of cable 23, release device 11 assumes the release position shown in FIG. 5, in which the free fall of crosshead 37 begins.

The holding position can mainly be seen in FIG. 2 and the release position can be seen as an overall view in FIG. 3. In the holding position, crosshead 37 is suspended from arm 8 by means of a cable loop 41 and shackle 38, wherein cable loop 41 is slung around carrying pulley 42 in pulley carrier 43. Otherwise the structure of crosshead 37 and the components it comprises are well known so that only those parts necessary for the free fall of crosshead 37 and the brake test are mentioned here. Crosshead 37 remains guided even during the free fall carried out for the brake test by means of four pairs of rolls 44 on guide rails 4, 5, wherein only the front rolls 44 can be seen in FIGS. 2 and 3. In the usual manner, a brake apparatus 45 comprising a well-known brake rod assembly extending up to a sensor member 46 is shown, wherein the sensor member 46 is extended in the holding position (FIG. 2) and correspondingly retracted in the release position (FIG. 3).

For purposes of brake testing, brace 6 is mounted on frame 1 as shown in FIGS. 1 to 3, and crosshead 37 is engaged with cable loop 41 and shackle 38 in release device 11. At a suitable distance below brace 6, the pair of spring brackets 24 is fixed on profiles 5 or on guide rails 4 or on both. The freefall experiment for the brake test is thus completely prepared. Cable 23 is then used to operate release device 11 from a safe distance so that release device 11 is brought from the holding position (FIG. 2) into the release position (FIG. 3) and thus the free fall of crosshead 37 begins. As soon as the brake sensors including sensor member 46 determine an extremely high acceleration of crosshead 37 leading to a predetermined trigger velocity being exceeded, brake apparatus 45 is activated and thus the emergency braking of crosshead 37 is carried out. Depending on the length of the braking distance which crosshead 37 travels until it comes to a standstill on frame 1, the operability of the brake apparatus 45 can be evaluated. In the worst case, crosshead 37 impacts with corresponding impact buffers on the impact plates 35 of spring brackets 24 of arrestor device 30.

Otherwise the explanations given in the introductory portion of the description apply with reference to the effect, the possibilities and the advantages of the safety device described as an exemplary embodiment with reference to FIGS. 1 to 7.

The invention claimed is:

1. A safety device for a crosshead of a decoking plant, comprising:

a crosshead arranged to be liftable and lowerable by means of a carrying device on profiles of a frame above a drum adapted to receive coke, wherein the crosshead is (1) guided on guide rails of the profiles by means of rolls, (2) carried by a cable of a winch slung around return pulleys at the top of the frame and around a carrying pulley rotatably supported at the top end of the crosshead; and (3) equipped with brakes for stopping the crosshead in an emergency, when the carrying device fails, and for intercepting the crosshead and fixing it on the guide rails or on the profiles; and a test apparatus for testing the crosshead brakes on site comprising a release device for releasing the crosshead from the carrying device in order to simulate a free fall of the crosshead and an arrestor device for the crosshead releasably attachable on the frame at a distance below the brace.

2. The safety device according to claim 1, characterized in that the carrying device comprises a brace which is attachable at both ends on the guide rails and/or on the profiles of the frame in a releasable manner.

3. The safety device according to claim 2, characterized in that the release device is provided on an arm which is attached on the brace and which is oriented down-wards in use.

4. The safety device according to claim 3, characterized in that a release lever is pivotably supported on arm, which is pivotable from a holding position, in which a suspension device of the crosshead is fixed on the arm, to a release position, in which the suspension device is released by the arm.

5. The safety device according to claim 4, characterized in that the crosshead is attachable on the brace by means of a suspension device, comprising a cable loop slung around the carrying pulley of the crosshead and a shackle for engaging in the release device on the arm of the brace.

6. The safety device according to claim 5, characterized in that the arrestor device consists of a pair of spring brackets each releasably attachable in an opposed position on the profiles of the frame and/or on the guide rails.

7. The safety device according to claim 6, characterized in that the spring brackets each carry an impact plunger vertically guided in a sprung manner and coming into contact with an impact surface on the underside of the crosshead in the freefall test.

* * * * *